United States Patent
Candiloro et al.

(10) Patent No.: US 11,090,761 B2
(45) Date of Patent: Aug. 17, 2021

(54) VOICE COIL MOTOR OPERATED LINEAR ACTUATOR

(71) Applicant: THORLABS MEASUREMENT SYSTEMS INC., Blairstown, NJ (US)

(72) Inventors: Carl Brian Candiloro, Hudson, MA (US); Bradley Hunter, Lexington, MA (US); Kurt Sidor, Plaistow, NH (US); Mark S. Longmuir, Tamworth, NH (US)

(73) Assignee: THORLABS MEASUREMENT SYSTEMS INC., Blairstown, NJ (US)

( * ) Notice: Subject to any disclaimer, the term of this patent is extended or adjusted under 35 U.S.C. 154(b) by 138 days.

(21) Appl. No.: 16/559,997

(22) Filed: Sep. 4, 2019

(65) Prior Publication Data
US 2019/0389003 A1    Dec. 26, 2019

Related U.S. Application Data

(63) Continuation of application No. 15/364,898, filed on Nov. 30, 2016, now Pat. No. 10,500,676.
(Continued)

(51) Int. Cl.
*H02K 41/035*    (2006.01)
*B23K 26/06*    (2014.01)
(Continued)

(52) U.S. Cl.
CPC ........ *B23K 26/0648* (2013.01); *B23K 26/046* (2013.01); *H02K 11/22* (2016.01);
(Continued)

(58) Field of Classification Search
CPC .... B23K 26/0648; H02K 11/22; H02K 11/33; H02K 41/0356; H02K 9/04;
(Continued)

(56) References Cited

U.S. PATENT DOCUMENTS 4,437,645 A * 3/1984 Nomura ................ F16K 31/082
                                                    251/129.21
5,471,100 A * 11/1995 Sakamoto .......... H02K 41/0356
                                                    310/12.04
(Continued)

OTHER PUBLICATIONS

U.S. Non-Final Office Action corresponding to U.S. Appl. No. 15/364,898; dated Sep. 28, 2018.
(Continued)

*Primary Examiner* — Emily P Pham
(74) *Attorney, Agent, or Firm* — Myers Wolin, LLC

(57) ABSTRACT

An actuator may include a stator, a pole; a bobbin; and windings provided around an exterior surface of the bobbin. The stator may include a stator body; and a plurality of magnets circumferentially arranged around an inner surface of the stator body. The stator, the pole, and the bobbin may be coaxial. An outer diameter of the pole may be smaller than an inner diameter of the bobbin such that the bobbin is movable in an axial direction over an exterior surface of the pole. An outer diameter of the bobbin may be smaller than an inner diameter of the stator such that the bobbin is movable in an axial direction inside the plurality of magnets circumferentially arranged around the inner surface of the stator body.

14 Claims, 5 Drawing Sheets

Related U.S. Application Data

(60) Provisional application No. 62/297,516, filed on Feb. 19, 2016.

(51) Int. Cl.
 | | |
 |---|---|
 | *H02K 11/33* | (2016.01) |
 | *H02K 11/22* | (2016.01) |
 | *B23K 26/046* | (2014.01) |
 | *H02K 3/32* | (2006.01) |
 | *H02K 9/04* | (2006.01) |

(52) U.S. Cl.
 CPC ......... *H02K 11/33* (2016.01); *H02K 41/0356* (2013.01); *H02K 3/32* (2013.01); *H02K 9/04* (2013.01)

(58) Field of Classification Search
 CPC .... H02K 41/0354; G02B 13/009; G02B 7/10; G02B 13/004; G02B 13/0045; G02B 13/0075; G02B 15/10; G02B 15/14; G02B 27/0025; G02B 7/04; G02B 7/08; A01K 2227/105; A01K 2267/0318; A01K 67/0278; C07K 16/40; C07K 2317/34; C12N 15/113; C12N 2310/20; C12N 2799/025; C12N 2799/027; C12N 9/22; C12Q 2600/118; C12Q 2600/136; C12Q 2600/158; C12Y 111/01009; G03B 17/02; G03B 17/04; G03B 43/00; G03B 5/00
 See application file for complete search history.

(56) References Cited

U.S. PATENT DOCUMENTS

| | | |
|---|---|---|
| 5,844,673 A | 12/1998 | Ivers |
| 5,983,847 A * | 11/1999 | Miyoshi ................... F01L 9/04 |
| | | 123/90.11 |
| 6,509,996 B2 | 1/2003 | Stokes |
| 6,633,101 B2 | 10/2003 | Stokes |
| 6,921,893 B1 | 7/2005 | Petschik |
| 7,482,575 B2 | 1/2009 | Sidor et al. |
| 7,688,432 B1 | 3/2010 | Benner |
| 8,508,726 B2 | 8/2013 | Benner |
| 8,680,429 B2 | 3/2014 | Stokes et al. |
| 8,711,345 B2 | 4/2014 | Candiloro et al. |
| 2006/0153413 A1 | 7/2006 | Nakajima et al. |
| 2008/0180775 A1 | 7/2008 | Gill |
| 2011/0135111 A1 | 6/2011 | Suzuki |
| 2012/0025633 A1* | 2/2012 | Lee ......................... H04N 5/44 |
| | | 310/12.16 |
| 2014/0132962 A1 | 5/2014 | Petschik et al. |
| 2014/0340574 A1 | 11/2014 | Han |
| 2015/0219179 A1 | 8/2015 | Cui et al. |
| 2016/0279808 A1 | 9/2016 | Doughty et al. |
| 2017/0244310 A1 | 8/2017 | Candiloro et al. |
| 2017/0278608 A1 | 9/2017 | Kusunoki et al. |

OTHER PUBLICATIONS

U.S. Final Office Action corresponding to U.S. Appl. No. 15/364,898; dated Apr. 17, 2019.

* cited by examiner

VOICE COIL MOTOR OPERATED LINEAR ACTUATOR

CROSS-REFERENCE TO RELATED APPLICATIONS

The present application is a continuation application of U.S. patent application Ser. No. 15/364,898, filed on Nov. 30, 2016, the entire contents of which are incorporated herein by reference and priority to which is hereby claimed. Application Ser. No. 15/364,898 claims the benefit of U.S. Provisional Patent Application Ser. No. 62/297,516, which was filed on Feb. 19, 2016, which is hereby incorporated by reference.

BACKGROUND

Technical Field

The invention relates generally to linear actuators and, in particular, to voice coil motor operated linear actuators.

Background Information

A laser beam material processing system requires a laser beam to remain in focus with respect to the surface of an object that is being scribed, engraved or drilled. For a planar work surface this is referred to as field flattening. The dynamic requirements of field flattening are rather modest and require relatively lower performance with respect to the x and y mirror speeds scanner. If the object is non-planar, transitions in the surface require dramatically increased dynamic adjustment of the focal plane of the scanned laser beam up or down in order that the beam remain in focus at the surface. As the laser beam is scanned across the non-planar object, a small pre-objective lens or lens group situated in the optical path moves along the beam axis causing the height at which the beam is in focus, i.e., the focal plane, to move up or down. The pre-objective lens or lenses must thus rapidly move over a range of several millimeters with extremely high acceleration to ensure that the focal point of the laser beam remains at the surface. Examples of such systems are a laser scribing system and a high dynamic focus adjuster used in a pre-objective scanner or coupled to a traditional F-theta style laser scanning system to enhance deep engraving and hole drilling capability.

In order to remain in focus as the beam is scanned across an object with sharp vertical transitions, for example, steps in height, the pre-objective lens needs to essentially instantaneously reposition. Accordingly, there is a great incentive to optimize the lens movement to achieve as high rate of acceleration as possible so that the dynamic focus of the laser beam can follow the sharp vertical transitions. Further, the fast dynamic focus enables both faster field flattening and high scan rates over the non-flat contoured or stepped surfaces, and thus, reduces process cycle time to scribe, engrave or drill the surface.

The rapid translational movement of the lens, and in some conditions rapid small amplitude movements, puts stress on associated bearings that promote the movement. Ball bearings, for example, are particularly susceptible to early wear when operating at rapid, small amplitude oscillations, due to the propensity to displace lubricant between the balls and races when the motion covers only a fraction of a ball rotation. Accordingly, the system may require additional maintenance and suffer associated down time.

Further, additional complexity is required to translate the rotational movement provided by the ball bearings to the desired translational movement of the lens along the beam axis.

SUMMARY

An actuator utilizes a voice coil motor with one or more voice coil windings supported on a light weight moveable bobbin that connects at one end to move an object rapidly up to a small number of millimeters translationally along a system axis. The bobbin moves over a distal portion of a center pole of a stator, which supports the voice coil motor magnets. The pole, which acts as a flux path for the voice coil motor, also provides a thin film of air in a gap between the pole and the bobbin via an air path and corresponding holes at the distal end of the pole. The bobbin moves translationally relative to the pole on the thin film of air under the control of the voice coil motor.

BRIEF DESCRIPTION OF THE DRAWINGS

The description below refers to the accompanying drawings, of which.

DETAILED DESCRIPTION OF AN ILLUSTRATIVE EMBODIMENT

An actuator is described in conjunction with translational movement of a pre-objective or other lens in a laser beam focusing subsystem of a laser scanning system. The actuator may instead or in addition be used in other systems that repeatedly require rapid translational movements of light weight objects over relatively short distances, e.g., small numbers of millimeters.

Figure 1:
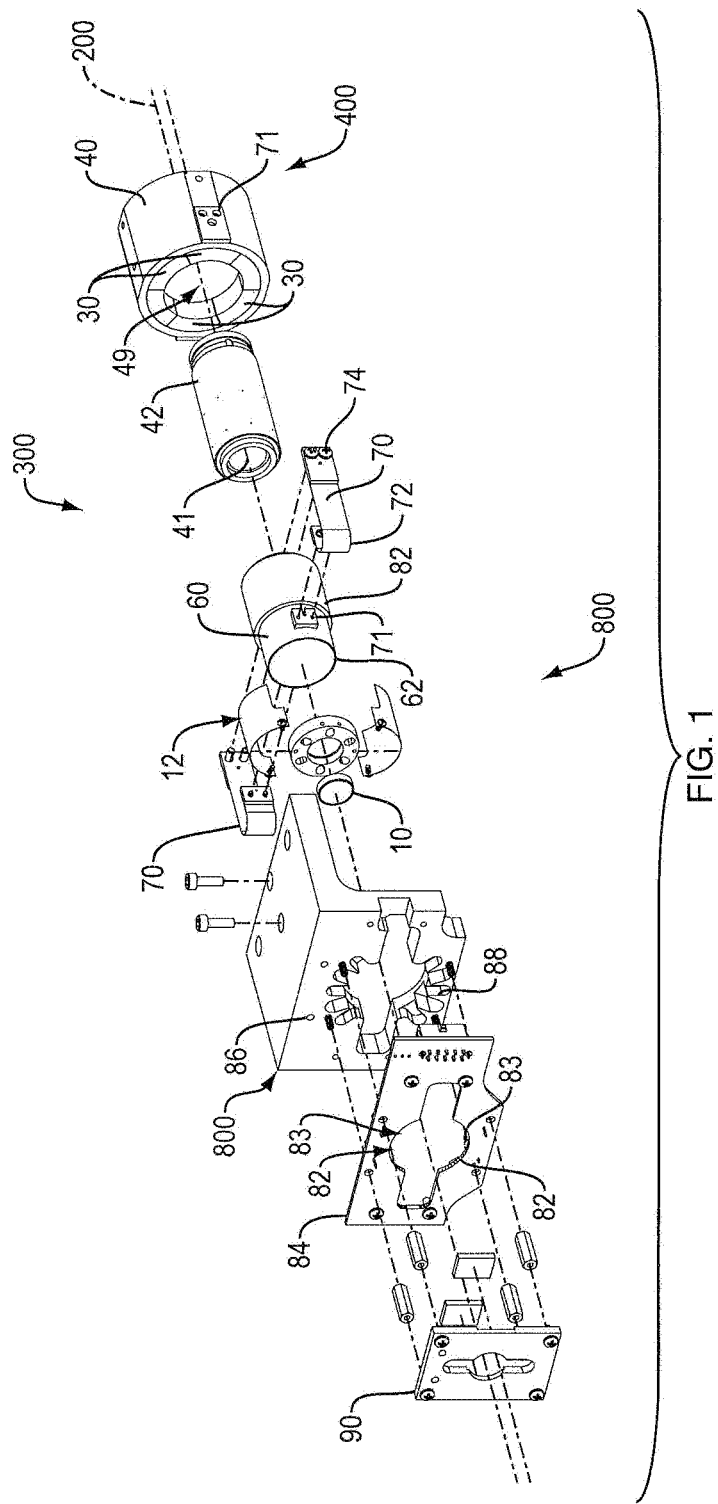
FIG. 1 depicts an exploded view of a system including an actuator constructed in accordance with the invention.
Figure 2:
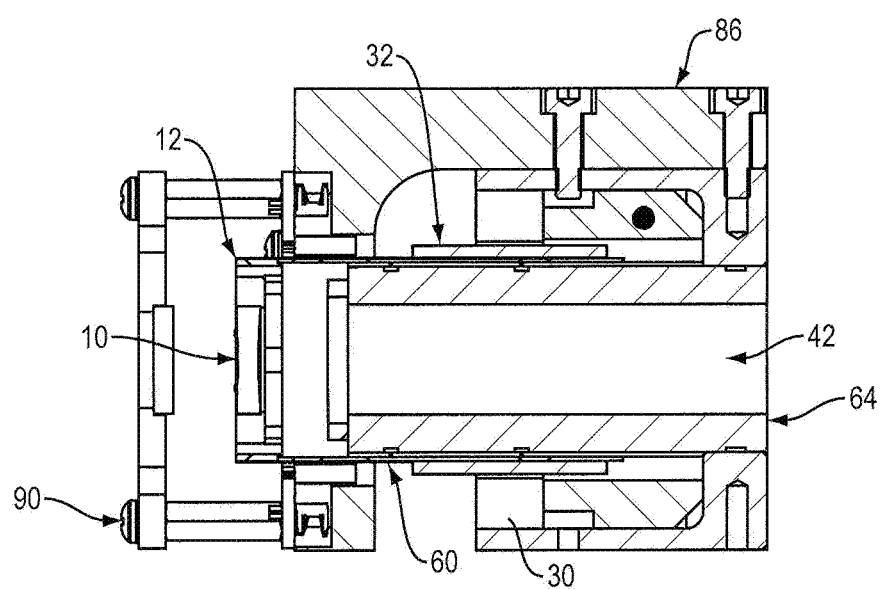
FIG. 2 depicts a portion of the actuator of FIG. 1 in more detail.

Referring to FIGS. 1 and 2, an actuator 100 provides rapid translational movement of a lens 10 along a beam axis of an optical path 200 (denoted by dotted lines) of a scanning laser (not shown), to control the focal plane of the laser beam as the laser scans across an object. The actuator includes a voice coil motor 300. One or more voice coil motor magnets 30 are supported on a base 40 of a stator 400. The windings of a voice coil 32 of the voice coil motor 300 are positioned on a light-weight moveable bobbin 60, which connects at one end 61 to move the lens 10 translationally in either direction along the optical path 200. The bobbin 60 is sized to move over a distal end 62 of a stationary pole 42, which includes a center bore 41 that coincides with the optical path 200. As described in more detail below, the pole 42 provides, in a gap 64 between the bobbin 60 and the pole 42, a thin layer of air on which the bobbin 60 moves under the control of the voice coil motor 300. The bobbin thus moves translationally over the distal end 62 of the pole 42 essentially without making direct contact with the pole.

Figure 3:
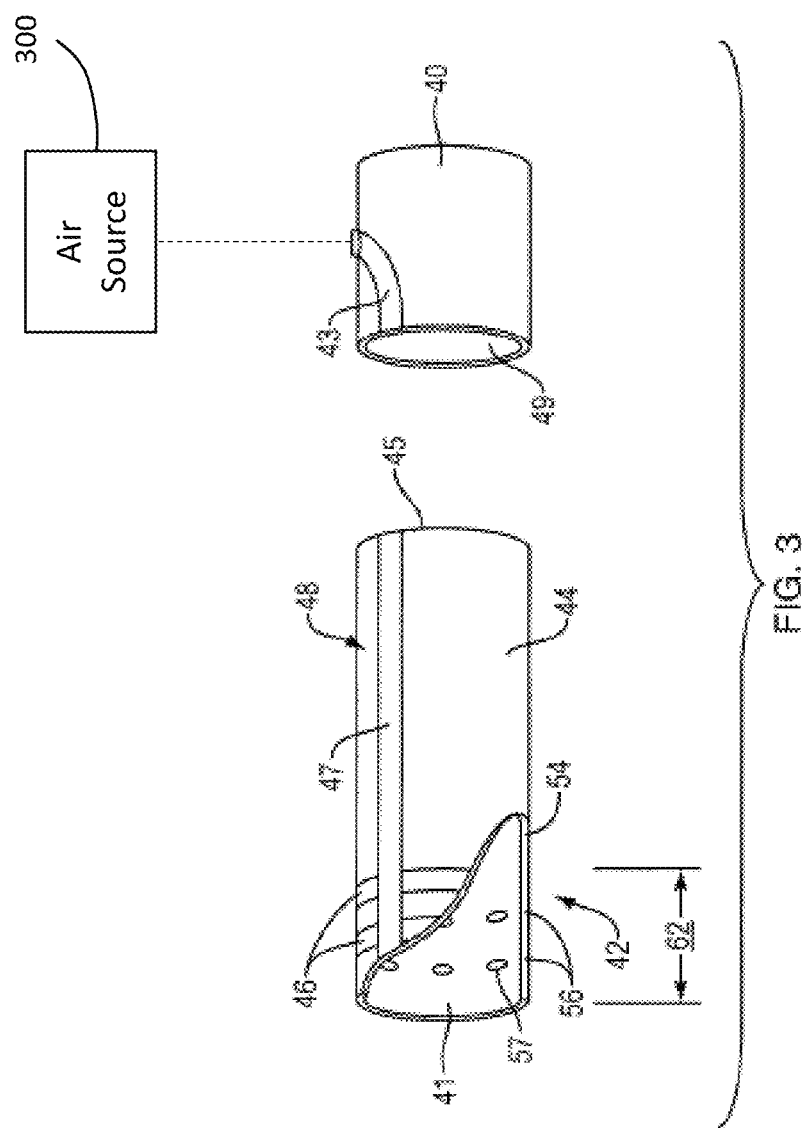
FIG. 3 depicts a cut away view of a portion of the actuator of FIG. 1.

Referring also to FIG. 3, the pole 42 includes a cylinder 44 and an outer shell 54. The cylinder is constructed of material that provides a flux path for the magnetic circuit of the voice coil motor 300. In the example, the cylinder is made of low carbon steel. The cylinder 44 is drilled through to provide the center bore 41. At the distal end 62, a series of circumferential grooves 46 are cut along the outside of the cylinder 44 as part of an air path 48. The air path 48 further includes an axial channel 47 that extends between the grooves 46 and a proximal edge 45 of the pole 42, to provide an inlet for air.

The outer shell 54 of the pole 42 includes one or more sets 56 of holes 57 in locations that correspond to the locations of the circumferential grooves 46. In the example, two sets 56 of holes 57 are spaced around the two circumference of the shell 54 in locations that correspond to the circumferential grooves 46. The outer shell 54, in the example, is constructed of 0.5 mm thick stainless steel and is thermally shrunk over the cylinder 44. The outer diameter of the pole 42 is ground to be slightly smaller than the inner diameter of the bobbin 60, to provide the gap 64 between the bobbin 60 and the pole 42. In the example, the assembled pole 42 has an outer diameter that is 16 microns (0.016 mm) less than the inner diameter of the bobbin 60.

The pole 42 fits into a center opening 49 in the stator base 40, such that the axial groove 47 of the air path 48 aligns with and connects to one side of a port 43 through which air is supplied from an air source 300, for example, a compressor. The bobbin 60 slides over the distal end 62 of the pole 42, leaving the gap 64 between the two components. When air is supplied through the port 43 to the air path 48, a film of air is produced within the gap 64, and the bobbin 60 moves translationally relative to the pole 42 on the film of air under the control of the voice coil motor 300. The bobbin thus moves essentially without making direct contact with the pole, and frictional wear to the bobbin is minimized.

The air path 48 as illustrated includes two circumferential grooves 46 and two sets 56 of holes 57. The holes 57 have 0.18 mm diameters and a set consists of 6 holes that are spaced evenly around the circumference of the shell 54. The circumferential grooves are located and spaced to provide a thin film of air that coincides with the maximum distance over which the bobbin 60 may be driven to move by the voice coil motor 300. The air path 48 may be designed to cover the maximum distance 62 with fewer or more circumferential grooves 46, as needed, and the number of sets 56 of holes 57 and the number of holes in each set may be increased or decreased accordingly.

The bobbin 60 is a thin-walled, light weight hollow cylinder with an inner diameter that is sized to move over the distal end section 62 of the pole 42 on the air layer provided in the gap 64. As discussed, the voice coil 32 is mounted on the bobbin 60. A distal end 62 of the bobbin extends slightly beyond the voice coil windings, to connect to a lens mount 12, which in turn holds the lens 10. The lens 10, in the example, is 12.7 mm in diameter and weighs 1.6 grams. The bobbin 60 is preferably constructed of a relatively stiff, thermally conductive material. In the example, the bobbin is 41 mm long and is constructed of a thermally conductive ceramic with a high specific stillness, such as, aluminum oxide. The thickness of the bobbin wall is approximately 0.5 mm.

The combined light weight and high specific stiffness of the relatively short cylindrical bobbin allows the bobbin to rapidly move the lens 10 the expected short distances, i.e., small numbers of millimeters, and settle the lens into new positions along the optical path 200 without significant residual vibration. Accordingly, the laser beam can be efficiently focused through the lens 10 at the desired focal plane.

The thermally conductive material of the bobbin 60 conducts heat produced by the voice coil 32 to the thin film of air over which the bobbin moves. The exhaustion of the air out of the system through the open ends of the gap 64 dissipates the heat produced by the voice coil. The voice coil motor 300 can thus continue to operate efficiently without requiring additional components for cooling the voice coil to be included in the system.

Figure 5:
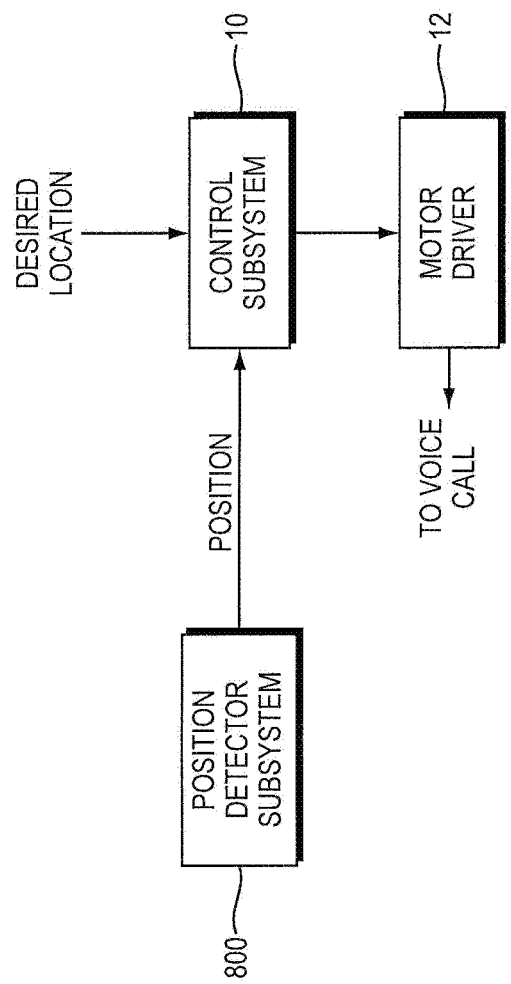
FIG. 5 is a functional block diagram of a control subsystem for use with the system of FIG. 1.

One or more pairs of flexible circuits 70 provide energy to the voice coil 32. The respective flexible circuits 70 attach at a first end 72 to the bobbin 60 and connect to an end of the voice coil 32, the second ends 74 of the respective flexible circuits, attach to the stator base 40 and connect to wires of a motor driver 12 (FIG. 5). The flexible circuits 70 are constructed in a known manner as a single layer of copper between layers of polyamide. The flexible circuits attach to the bobbin 60 and stator base 40 via anchors 71. The flexible circuits 70 are the only connection between the stationary and the moving parts of the actuator, and add minimal weight to the moveable bobbin 60.

The flexible circuits 70 are designed to make a 180° fold and are installed such that the fold rolls as the bobbin 60 moves the lens 10 along the optical path 200. The copper layer is at the neutral axis of the bend. To minimize stress in the copper and polyimide layers, the flexible circuits 70 are designed with a relatively large ratio of radius to thickness, e.g., on the order of 20.

To constrain the bobbin 60 against rotational movement around a central axis of the system, that is, relative to the stator 400, the flexible circuits 70 are aligned on opposite sides of the bobbin 60. Further, the flexible circuits are designed to be relatively wide compared to their thickness, for example, the flexible circuits may be 10 mm wide and 0.1 mm thick. In the example, a single pair of flexible circuits 70 is utilized, however, additional pairs of flexible circuits may be arranged on opposing sides of the bobbin, as needed to constrain the rotational movement. Constraints on the pitch and tilt of the bobbin 60 relative to the center bore 49 of the stator 400 are provided by the pole 42 over which the bobbin moves. Further, a stop 90 may be included as a constraint for the maximum translational movement of the lens 10.

The system further includes a position detector subsystem 800 that provides information about the relative position of the bobbin 60, and thus, the position of the lens 10 along the optical path 200. The position detector subsystem does not contact the bobbin 60 and thus does not add mass to the moving component of the actuator. The position detector subsystem includes a plurality of infrared emitters and detectors 82, 83 that are arranged circumferentially at a known point along the maximum distance traveled by the bobbin 60. A stationary mount 84 holds the respective emitters and detectors in place. The mount 84, in turn, attaches to a structure 86 that includes grooves 88 that block extraneous light from reaching the photodetectors 83.

Figure 4:
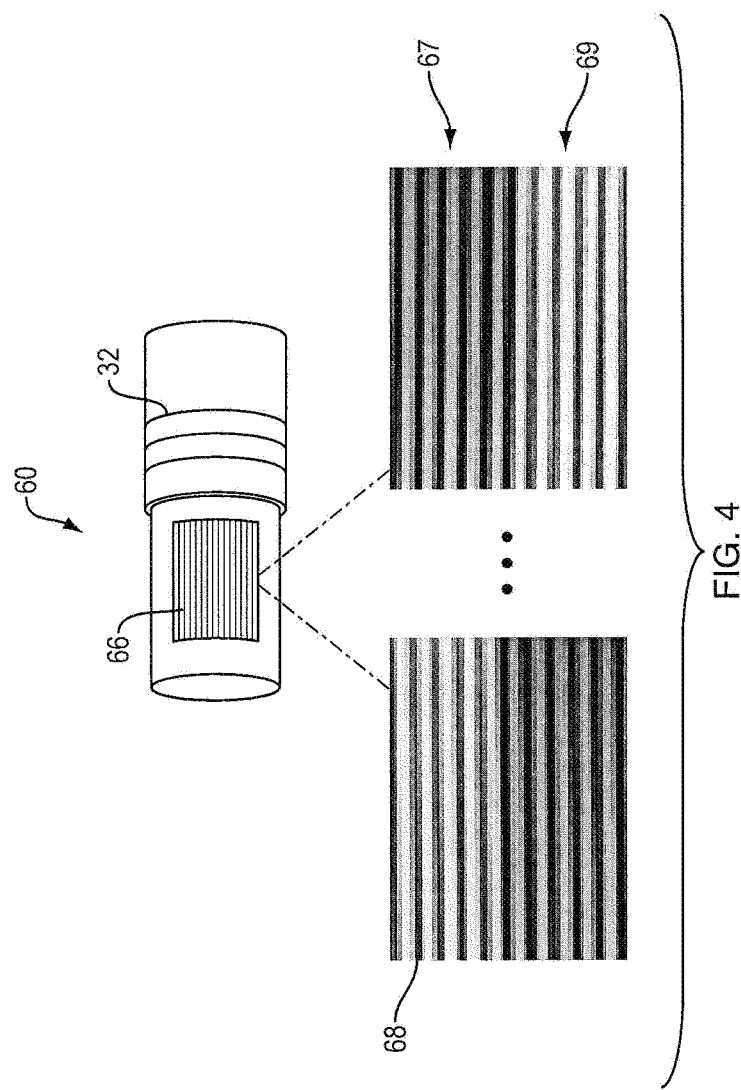
FIG. 4 depicts in more detail a bobbin of the actuator of FIG. 1.

Referring also to FIG. 4, the bobbin 60 has imprinted thereon, either directly or as an added coating, an optical pattern 66 consisting of a plurality of wedges 68 that have reflective and antireflective orientations. In the example, the pattern 66 is printed on a thin aluminum substrate which is then formed and bonded to the ceramic bobbin 60.

The pattern 66 utilizes alternating channels 68, 69 that have different reflective and anti-reflective orientations. As the bobbin 60 moves, the reflective and anti-reflective channels are in particular locations relative to the stationary emitters and detectors 82, 83. Accordingly, at any given time, the light reflected by the pattern 66 to the respective photodetectors 83 corresponds to the relative positions of the reflective and antireflective channels 67, 69 and the position of the bobbin can be accurately determined based on the relative intensities of the light at the respective photodetectors.

Duplicates of the pattern 66 may be included at multiple locations around the circumference of the bobbin 60, such that the responses of the photodetectors 83 arranged circumferentially on the mounting 84 may be averaged to determine the relative position of the bobbin.

The pattern 66 consists of wedges 68, which are arranged in multiple sets in each of the two opposing channels 67, 69. In one channel the wedges transition from light to dark (more reflective to less reflective), while in the adjacent channel the transitions are reversed. As the bobbin 60 moves, one of the channels will generate an increasing photocurrent in the photodetectors, while the other channel will generate a correspondingly smaller photocurrent. The difference of the two signals corresponds to the relative position of bobbin 60. In the example, the emitters and photodetectors 82, 83 are situated at the center of the maximum path traveled by the bobbin 60, and when the bobbin is at the mid-point the two photocurrents are equal and hence the difference is zero. Travel toward one end of the path over which the bobbin moves will yield an increasingly positive difference signal, while travel in the reverse direction will yield an increasing negative signal. The channels are arranged such that the difference signal changes linearly with the movement of the bobbin 60.

The wedges 68 are approximately 0.150 mm wide and taper to 0.075 mm. A gap of roughly the same size separates the individual wedges. The size and spacing of the respective wedge lines in the pattern 66 are chosen to provide an averaging of a plurality of individual wedges 68 within the field of view of the photodetectors 83. The averaging reduces position errors due to defects or inconsistencies in the printing of the pattern 68 on the bobbin 60. The arrangement of multiple emitters and detectors 82, 83 circumferentially along path over which the bobbin moves ensures both even illumination and a field of view that includes the respective channels, to ensure that the system is insensitive to minor rotations of the bobbin. The inclusion on the bobbin 60 of at least duplicate patterns separated by 180 degrees provides additional averaging and insensitivity to any radial offset of the bobbin 60, as the bobbin moves.

For ease of understanding, the system components that operate in a known manner to determine the locations to which the lens 10 is to be moved along the optical path 200 in order to focus the laser beam at the desired focal plane at the surface of an object are not shown. Referring now also to FIG. 5, the desired location information is provided by the system components to a control subsystem 10, which in turn operates the motor driver 12 that controls the voice coil motor 300. The control subsystem 10 also receives, from the position detection subsystem 800, information relating to the relative position of the bobbin 60, and thus, the location of the lens 10 along the optical path 200. Based on the position information and the desired location information, the control subsystem 10 operates the motor driver 12 to control the direction and the duration of the current provided to the voice coil 32, which directs the movement of the bobbin 60 from its current position to a next position to move the lens 10 to the desired next location along optical path 200.

As discussed, the actuator 100 may be used in the same manner to move other small, lightweight objects translationally along a path that coincides with the directions of the movement produced via the voice coil 32. The object is connected to and thus moves with the bobbin and the control subsystem 10 operates in the same manner to control the voice coil motor 300 to move the bobbin from a current position to a next position relative to a stationary pole 42 that provides the thin film of air over which the bobbin moves.

In brief summary, the actuator 100 efficiently operates to rapidly move a minimal mass consisting of the bobbin 60, the supported voice coil 32, the lens 10 and the lens mount 12 under the control of the voice coil motor 300. The voice coil motor 300 operates in a known manner to drive the voice coil and thus the bobbin 60 transversely relative to the stationary stator, which houses the voice coil magnets 30. Accordingly, additional components are not required to translate the motion from, for example, the rotational motion provided by a ball bearing to the translational motion along the beam axis of the optical path. The bobbin 60 moves on a thin film of air provided in the gap 64 by the air flow path 48 of the stationary pole 42, thus minimizing associated frictional wear. The bobbin 60 is constructed of thermally conductive material that conducts the heat that is produced by the voice coil 32 to the film of air over which the bobbin moves. As the air exhausts out of the ends of gap 64 between the bobbin 60 and the pole 42, the heat is dissipated. Accordingly, there is no need for additional components for the cooling of the voice coil. Furthermore, the bobbin is constructed of a light weight material that is sufficiently stiff to minimize associated settle time. Accordingly, the laser beam is readily focused on a desired focal plane by the re-positioned lens 10, and downtime between operations, such as, laser scribbing operations, is minimized.

What is claimed is:

1. An actuator comprising:
    a voice coil motor including one or more magnets and a voice coil;
    a stator supporting the one or more magnets and including a center pole that provides a flux path for the voice coil motor;
    a moveable bobbin supporting windings of the voice coil and connecting to move an object translationally over at least a distal portion of the center pole in response to activation of the voice coil motor, the moveable bobbin having an inner diameter that is sized to provide a gap between the moveable bobbin and the center pole;
    the center pole including an air path and corresponding holes to provide in the gap between the moveable bobbin and the center pole a film of air over which the moveable bobbin moves in response to activation of the voice coil motor; and
    an air source fluidly coupled to the air path so as to supply compressed air to the gap between the moveable bobbin and the center pole to generate the film of air.

2. The actuator of claim 1, wherein the air path includes one or more circumferential channels located in the distal portion of the center pole and an axial channel that connects to the air source, and the holes are in locations that correspond to the channels.

3. The actuator of claim 1, wherein the moveable bobbin consists of a thin walled thermally conductive cylinder, and the moveable bobbin conducts heat produced by the voice coil to the film of air.

4. The actuator of claim 1, wherein the thin walled thermally conductive cylinder is made of a light-weight and high specific stiffness ceramic.

5. The actuator of claim 1, wherein the moveable bobbin moves a lens along an axis of an optical path, and the center pole has a center bore that is coincident with the optical path.

6. The actuator of claim 1, further including a non-contact position detector subsystem that is mounted along a path over which the moveable bobbin moves.

7. The actuator of claim 6, wherein the position detector subsystem includes a plurality of emitters and photodetectors arranged around the circumference of the path, with the emitters shining light on the moveable bobbin and the detectors detecting light reflected from the moveable bobbin to determine a relative position of the moveable bobbin.

8. The actuator of claim 1, further including flexible circuits connected between the voice coil that is supported by the moveable bobbin and an energy source, the flexible circuits providing energy to the voice coils and constraining rotation of the moveable bobbin relative to the stator.

9. The actuator of claim 8, further including one or more pairs of the flexible circuits, each flexible circuit being anchored at a first end to the moveable bobbin and at a second end to the stator, the individual flexible circuits of a pair being anchored on opposite sides of the moveable bobbin to constrain rotation of the moveable bobbin relative to the stator.

10. An actuator comprising:
a stator comprising:
   a stator body; and
   a plurality of magnets circumferentially arranged around an inner surface of the stator body;
a pole;
a bobbin slidably mounted on and supported by said pole; windings provided around an exterior surface of the bobbin;
wherein the stator, the pole, and the bobbin are coaxial;
wherein an outer diameter of the pole is smaller than an inner diameter of the bobbin such that the bobbin is slidably movable in an axial direction along an exterior surface of the pole; and
wherein an outer diameter of the bobbin is smaller than an inner diameter of the stator such that the bobbin is movable in an axial direction inside the plurality of magnets circumferentially arranged around the inner surface of the stator body.

11. The actuator of claim 10, wherein an air cushion is provided between the exterior surface of the pole and an interior surface of the bobbin.

12. The actuator of claim 10, wherein a lens is mounted at a first end of the bobbin.

13. The actuator of claim 11, wherein the pole comprises an air path and a plurality of holes providing fluid communication between the air path and the exterior surface of the pole.

14. The actuator of claim 13, wherein a compressed air source is in fluid communication with the air path so as to provide compressed air to the air path and maintain the air cushion between the exterior surface of the pole and an interior surface of the bobbin.

* * * * *